United States Patent
Zhang et al.

(10) Patent No.: US 11,280,068 B2
(45) Date of Patent: Mar. 22, 2022

(54) LEVELING DIFFERENTIAL-PRESSURE DIVERSION PEAK-SHAVING WATER TANK WITH FUNCTION OF PREVENTING STAGNANT WATER AND STALE WATER AND WATER SUPPLY PUMPING STATION

(71) Applicant: Shandong Keyuan Water Supply and Drainage Equipment Engineering Co., Ltd., Shandong (CN)

(72) Inventors: Huiming Zhang, Shandong (CN); Lei Zhang, Shandong (CN); Yonghua Zhang, Shandong (CN); Jiandong Gao, Shandong (CN); Lianyong Wang, Shandong (CN); Yongqiang Wang, Shandong (CN)

(73) Assignee: Shandong Keyuan Water Supply and Drainage Equipment Engineering Co., Ltd., Dezhou (CN)

( * ) Notice: Subject to any disclaimer, the term of this patent is extended or adjusted under 35 U.S.C. 154(b) by 50 days.

(21) Appl. No.: 16/897,360

(22) Filed: Jun. 10, 2020

(65) Prior Publication Data
US 2020/0385959 A1     Dec. 10, 2020

(30) Foreign Application Priority Data
Jun. 10, 2019 (CN) .......................... 201910497631.1

(51) Int. Cl.
*E03B 11/00*  (2006.01)
*E03B 7/08*   (2006.01)
(Continued)

(52) U.S. Cl.
CPC ............... *E03B 7/08* (2013.01); *E03B 11/02* (2013.01); *E03B 5/00* (2013.01); *E03B 7/04* (2013.01); *E03C 1/108* (2013.01)

(58) Field of Classification Search
CPC . E03B 7/074; E03B 7/08; E03B 11/02; E03B 11/10; Y10T 137/86187;
(Continued)

(56) References Cited

U.S. PATENT DOCUMENTS

| 4,962,789 A * | 10/1990 | Benscoter ............... E03B 11/02 137/357 |
| 2002/0162802 A1* | 11/2002 | Simmons .................. F17C 3/02 210/739 |

(Continued)

FOREIGN PATENT DOCUMENTS

| CN | 107938761 A | 4/2018 |
| CN | 208309689 U | 1/2019 |

*Primary Examiner* — Reinaldo Sanchez-Medina
(74) *Attorney, Agent, or Firm* — Arent Fox LLP; Michael Fainberg (57) ABSTRACT

The present invention provides a leveling differential-pressure diversion peak-shaving water tank with a function of preventing stagnant water and stale water, which comprises a water storage and distribution tank, a water inlet pipeline, a water outlet pipeline and a front tank. The water inlet pipeline is arranged at the upper portion of the water storage and distribution tank and used for feeding water into the water storage and distribution tank. The water outlet pipeline is arranged at the lower portion of the water storage and distribution tank and comprises a main water outlet pipe and a plurality of water outlet branch pipes. One end of each water outlet branch pipe is connected with the main water outlet pipe. The front tank comprises a front tank water box, a front tank water inlet pipeline and a front tank water outlet pipeline. The present invention further provides a water supply pumping station.

14 Claims, 6 Drawing Sheets

(51) Int. Cl.
*E03B 11/02* (2006.01)
*E03B 5/00* (2006.01)
*E03B 7/04* (2006.01)
*E03C 1/10* (2006.01)

(58) Field of Classification Search
CPC ..... Y10T 137/86228; Y10T 137/86372; Y10T 137/86196
See application file for complete search history.

(56) References Cited

U.S. PATENT DOCUMENTS

| | | | |
|---|---|---|---|
| 2009/0139935 A1* | 6/2009 | Matousek | C02F 1/006 210/744 |
| 2012/0285897 A1* | 11/2012 | Fike | C02F 9/00 210/743 |
| 2015/0068625 A1* | 3/2015 | Singh | E03B 11/02 137/565.17 |

* cited by examiner

(Prior Art)

FIG. 6

LEVELING DIFFERENTIAL-PRESSURE DIVERSION PEAK-SHAVING WATER TANK WITH FUNCTION OF PREVENTING STAGNANT WATER AND STALE WATER AND WATER SUPPLY PUMPING STATION

CROSS-REFERENCE TO RELATED APPLICATIONS

This application claims priority to Chinese Patent Application No. 201910497631. 1 filed on Jun. 10, 2019, the entire contents of which is hereby incorporated by reference.

TECHNICAL FIELD

The present invention relates to water supplies, and in particular to a leveling differential-pressure diversion peak-shaving water tank with a function of preventing stagnant water and stale water and a water supply pumping station.

BACKGROUND

Figure 6:
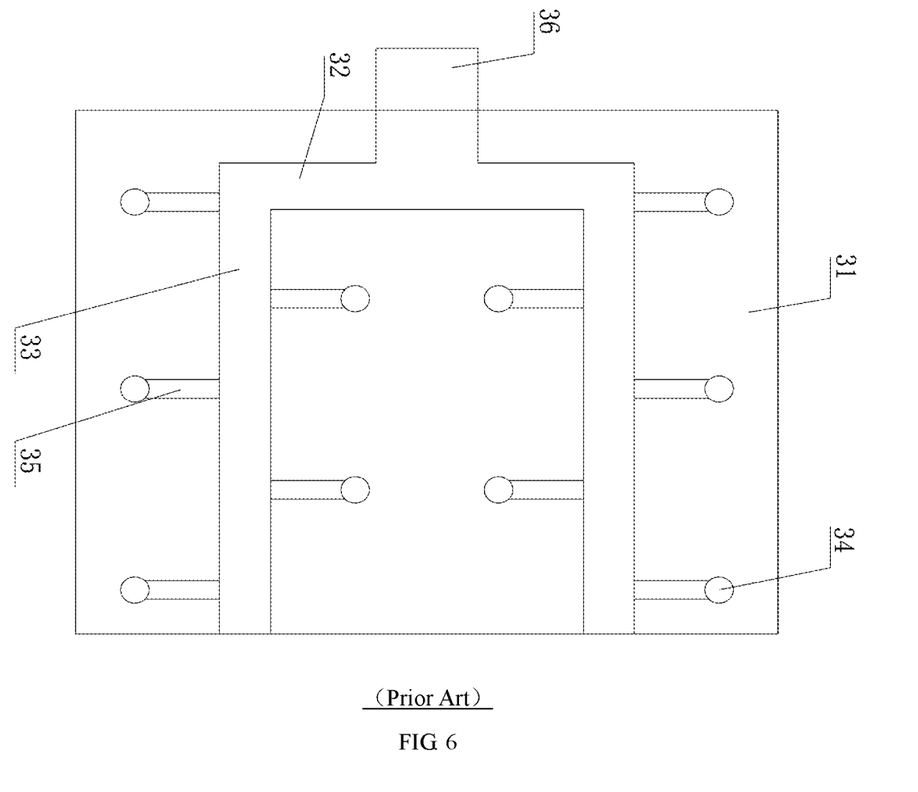
FIG. 6 is a schematic structural diagram of a water tank in the prior art.

The structure shown in FIG. 6 is mostly utilized to prevent the water tank from generating secondary pollution in the prior art. In this drawing, 31 represents a tank body, 32 represents main water guiding pipes, 33 represents water guiding branch pipes, 34 represents water-absorbing ball heads, 35 represents branch pipes, and 36 represents a water outlet pipe. All technical parameters of the diversion pipeline of the water tank follow the principle: the diversion cross-sectional area sum of all water-absorbing ball heads>the diversion cross-sectional area sum of all branch pipes>the diversion cross-sectional area sum of all water guiding branch pipes>the diversion cross-sectional area sum of all main water guiding pipes>the diversion cross-sectional area of the water outlet pipe>the diversion cross-sectional area of a water pump inlet pipe. The diversion cross-sectional area of the water pump inlet pipe must meet the maximum water supply amount requirement of the water pump. In actual application, the water pump mostly works at a flow rate far less than the rated flow rate. Thus, each water-absorbing ball head far away from the water outlet pipe has insufficient water inlet quantity, even does not feed the water, thereby generating a stagnant water region in a part of the water tank. Therefore, even if multiple water-absorbing ball heads are uniformly distributed on the bottom of the water tank, leveling uniform replacement of the water in the water tank cannot be achieved, and the water tank may generate secondary pollution.

SUMMARY

In view of the above defects of the prior art, in one aspect, an objective of the present invention is to provide a leveling differential-pressure diversion peak-shaving water tank with a function of preventing stagnant water and stale water, which is used for solving the problems in the prior art.

To achieve the foregoing objective and other related objectives, the present invention provides a leveling differential-pressure diversion peak-shaving water tank with a function of preventing stagnant water and stale. The water tank comprises:

a water storage and distribution tank;

a water inlet pipeline, arranged at the upper portion of the water storage and distribution tank and used for feeding water into the water storage and distribution tank;

a water outlet pipeline, arranged at the lower portion of the water storage and distribution tank and comprising a main water outlet pipe and a plurality of water outlet branch pipes, wherein one end of each water outlet branch pipe is connected with the main water outlet pipe, and the other end is closed; a plurality of water-absorbing holes A are formed in the pipe wall of each water outlet branch pipe and are uniformly distributed in the bottom of the water storage and distribution tank;

a front tank, comprising a front tank water box, a front tank water inlet pipeline and a front tank water outlet pipeline, wherein the front tank water inlet pipeline comprises a main front tank water inlet pipe and a plurality of front tank water inlet branch pipes; one end of the main front tank water inlet pipe is communicated with the main water outlet pipe of the water storage and distribution tank; a water level control valve is arranged on the main front tank water inlet pipe, and the control valve is switched on when the water level of the front tank water box reaches a preset value; one end of each front tank water inlet branch pipe is vertically communicated with the main front tank water inlet pipe, and the other end is closed; a plurality of water-absorbing holes B are formed in the side wall of each front tank water inlet branch pipe, and the area sum of the water-absorbing holes B is less than the area sum of the water absorbing holes A; the front tank water outlet pipeline is used for connecting a water pump water supply pipeline.

Preferably, the water inlet pipeline comprises a main water inlet pipe and a plurality of water inlet branch pipes. A water inlet port is formed in one end of the main water inlet pipe, and the other end is closed. One end of each water inlet branch pipe is communicated with the main water inlet pipe, and the other end is closed. A plurality of discharging holes are formed in the side wall of each water inlet branch pipe and are used for discharging water from the main water inlet pipe to the water storage and distribution tank.

Preferably, the water level control valve is a micro-resistance water inlet check valve in the prior art, referring to the patent with Chinese Patent Application No. CN208309689U.

Preferably, the water level control valve comprises an electrically-actuated diverter valve and a water level sensor. The electrically-actuated diverter valve and the water level sensor are connected with a control system through a control circuit. The electrically-actuated diverter valve is arranged on the main front tank water inlet pipe. The water level sensor is arranged on the front tank water box. When the water level of the front tank water box reaches a preset value of the water level sensor, the electrically-actuated diverter valve is switched on.

Preferably, the water storage and distribution tank and the front tank water box integrally form a water supply tank. The water supply tank is divided into the first chamber and the second chamber by a separator. The first chamber is the water storage and distribution tank, and the second chamber is the front tank water box.

Preferably, the leveling differential-pressure diversion peak-shaving water tank with a function of preventing stagnant water and stale water further comprises an aerating and flushing pipeline. The aerating and flushing pipeline comprises an aerating pipe and a flushing pipe.

An air inlet of the aerating pipe is connected with an air source, and an air outlet thereof is communicated with the main water outlet pipe.

One end of the flushing pipe is communicated with the aerating pipe, and the other end is communicated with the main water inlet pipe.

The flushing pipe is provided with a control valve A. A control valve B is arranged on the aerating pipe before the flushing pipe. A control valve C is arranged on the main water inlet pipe and between the aerating pipe and the flushing pipe.

Preferably, the aerating pipe is arranged approximately in the shape of n. The aerating pipe enters the water storage and distribution tank from the bottom of the water storage and distribution tank, goes upwards and around the main water inlet pipe, then goes downwards and is communicated with the main water outlet pipe. Such arrangement of the aerating pipe can prevent the water in the water outlet branch pipes from entering the aerating pipe through the water-absorbing holes A.

Preferably, the leveling differential-pressure diversion peak-shaving water tank with a function of preventing stagnant water and stale water further comprises a draining pipe for emptying water in the water storage and distribution tank and/or the front tank water box.

The present invention further provides a water supply pumping station. The water supply pumping station at least comprises one of the leveling differential-pressure diversion peak-shaving water tanks with a function of preventing stagnant water and stale water.

The water tank of the present invention has the following characteristics:

In a water supplying process of the water tank, firstly, the water enters the water storage and distribution tank through the water inlet pipeline. Secondly, the water enters the main water outlet pipe through each water-absorbing hole A. Thirdly, the water uniformly enters the front tank water box sequentially through the main front tank water inlet pipe and the water-absorbing holes B of the front tank water inlet branch pipes. Because the area sum of the water-absorbing holes B is less than the area sum of the water-absorbing holes A, the water level of the front tank water box is lower than the water level of the water storage and distribution tank to form the differential pressure. When the water level of the front tank water box is gradually increased to the preset water level, the water level control valve is switched on; meanwhile, the water quickly enters the front tank water box through each water-absorbing hole B and the water level control valve. At this time, the uniformly arranged water-absorbing holes A quickly absorb the water into the main water outlet pipe, and the water enters the front tank water box through the front tank water inlet pipeline (through the water-absorbing holes B and the water level control valve). Thus, the water level of the water storage and distribution tank is levelly and uniformly reduced under the action of the uniformly arranged water-absorbing holes A to prevent generating a stagnant water region and a stale water region.

The water tank of the present invention further has an aeration function. In an aerating process, the control valve A is switched off and the control valve B is switched on. The air enters the water outlet pipeline through the aerating pipe and also enters the water storage and distribution tank and the front tank water box through the water-absorbing holes A and the water-absorbing holes B. The air brings away sediments at the bottoms of the water storage and distribution tank and the front tank water box to prevent generating sediments at the bottom of the water tank.

The water tank of the present invention further has a back-flushing function. In use, the control valve B and the control valve C are switched off. The water enters the main water outlet pipe and the main front tank water inlet pipe through the flushing pipe and the aerating pipe. Finally, the water respectively flows into the water storage and distribution tank and the front tank water box through the water outlet branch pipes, the water-absorbing holes A, the front tank water inlet branch pipes and the water-absorbing holes B to flush the water storage and distribution tank and the front tank water box cleanly.

The water tank of the present invention further has an air-water-mixed flushing function. In use, the control valve A and the control valve B are switched on, and the control valve C is switched off. The water is mixed with the air in the aerating pipe through the water inlet pipeline and the flushing pipe. Then, the water-air mixture respectively enters the water storage and distribution tank and the front tank water box through the water outlet pipeline, the water-absorbing holes A, the front tank water outlet pipeline and the water-absorbing holes B. Thus, the water tank has a great self-cleaning function.

BRIEF DESCRIPTION OF THE DRAWINGS

In FIG. 1, FIG. 2 and FIG. 3, 1—flushing pipe, 2—main water inlet pipe, 3—control valve C, 4—water inlet branch pipe, 5—water storage and distribution tank, 6—micro-resistance water inlet check valve, 7—front tank water outlet pipeline, 8—main front tank water inlet pipe, 9—front tank water inlet pipeline, 10—draining pipe, 11—aerating pipe, 12—control valve B, 13—control valve A, 14—main water outlet pipe, 15—water-absorbing hole A, 16—front tank water inlet branch pipe, 17—water-absorbing hole B, 18—water outlet branch pipe, 19—front tank water box, and 20—drain valve.

In FIG. 4, 21—water level sensor, and 22—electrically-actuated diverter valve.

In FIG. 5, 105—water storage and distribution tank, and 119—front tank water box.

In FIG. 6, 31—tank body, 32—main water guiding pipe, 33—water guiding branch pipe, 34—water-absorbing ball head, 35—branch pipe, and 36—water outlet pipe.

DETAILED DESCRIPTION OF THE EMBODIMENTS

Implementation modes of the present invention are described below by using specific embodiments. Those skilled in the art can easily understand other advantages and effects of the present invention according to the content disclosed in the specification.

Refer to FIG. 1 to FIG. 4, it should be noted that the structure, the proportion, the size, and the like shown in the accompanying drawings of the specification are all used to cooperate with the content disclosed in the specification, are provided for those skilled in the art to learn and read, and are not used to limit a limiting condition under which the present invention can be implemented. Therefore, they do not have substantive meanings in the technology. Any modifications of the structure, changes of proportional relationships, or adjustments of the size shall fall within the scope that can be covered by the technical content disclosed by the present invention, without affecting the effects produced by the present invention and the objectives achieved by the present invention. Moreover, terms such as "above", "below", "left", "right", "middle" and "one" used in the specification are also only to facilitate clear descriptions, and are not used to limit the scope where the present invention can be implemented. Changes or adjustments of the relative relationship thereof should also be considered as the scope where the present invention can be implemented, without substantially changing the technical content.

Figure 1:
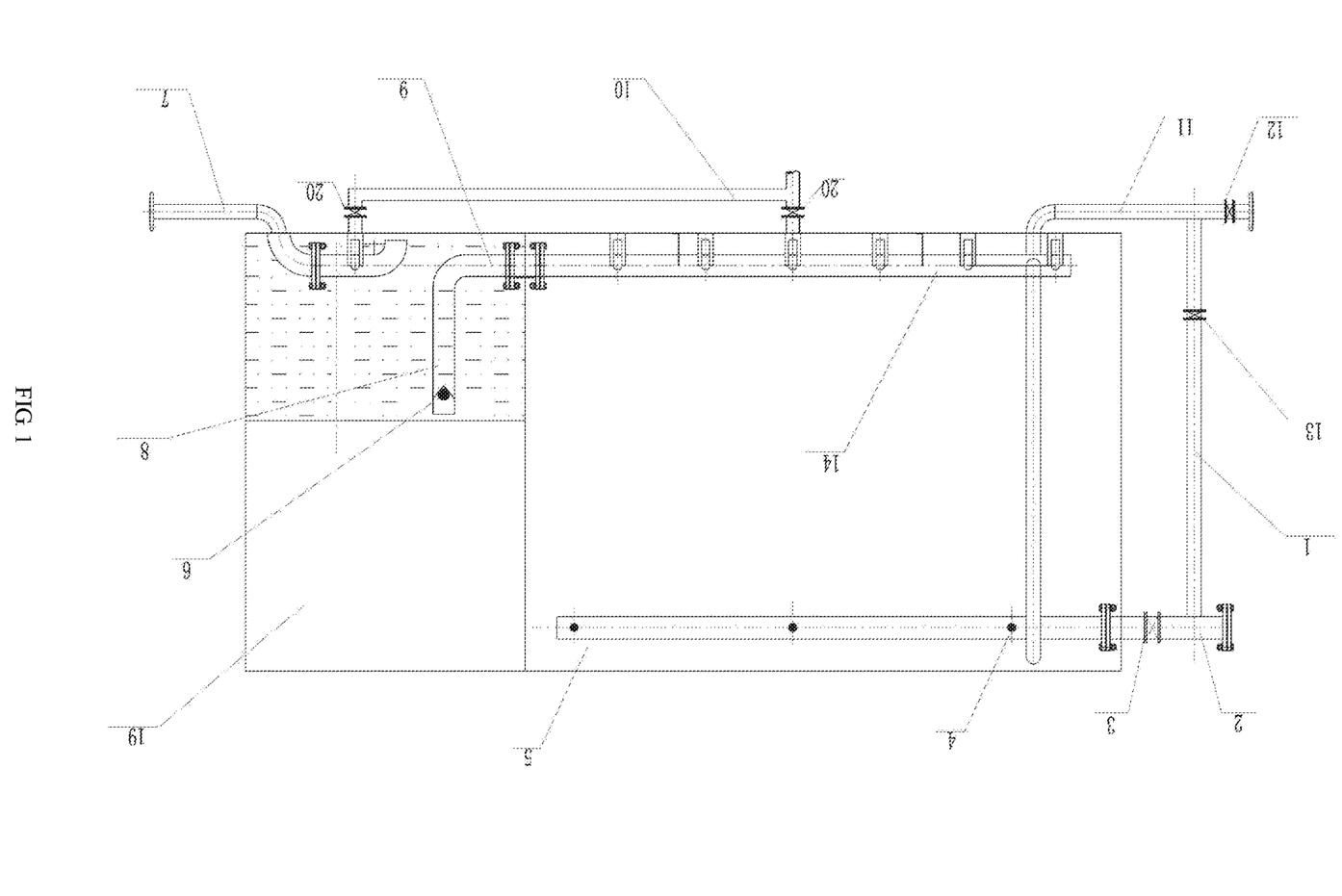
FIG. 1 is a front view of a structure of Embodiment 1.
Figure 2:
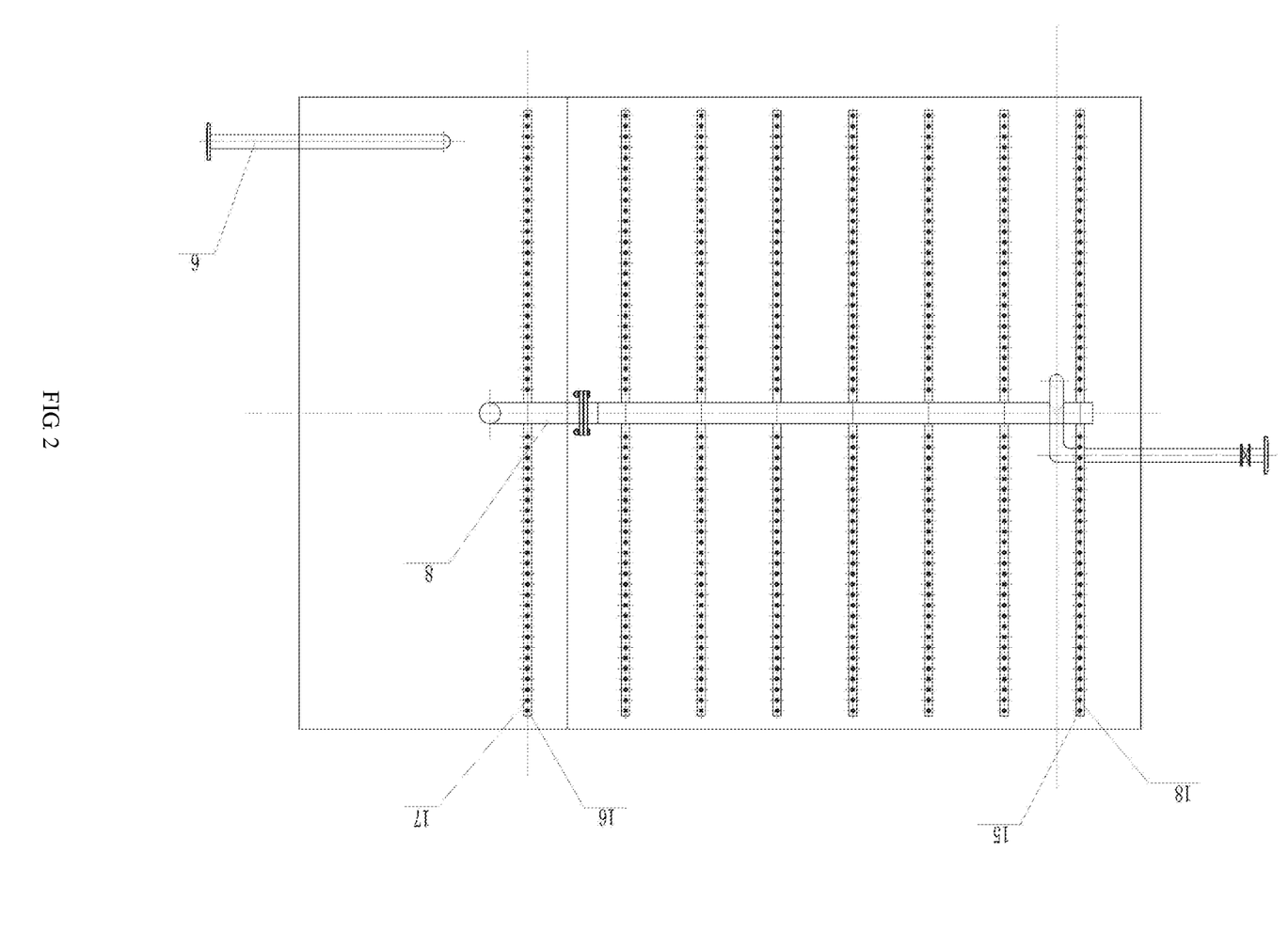
FIG. 2 is a top view of a structure of Embodiment 1.
Figure 3:
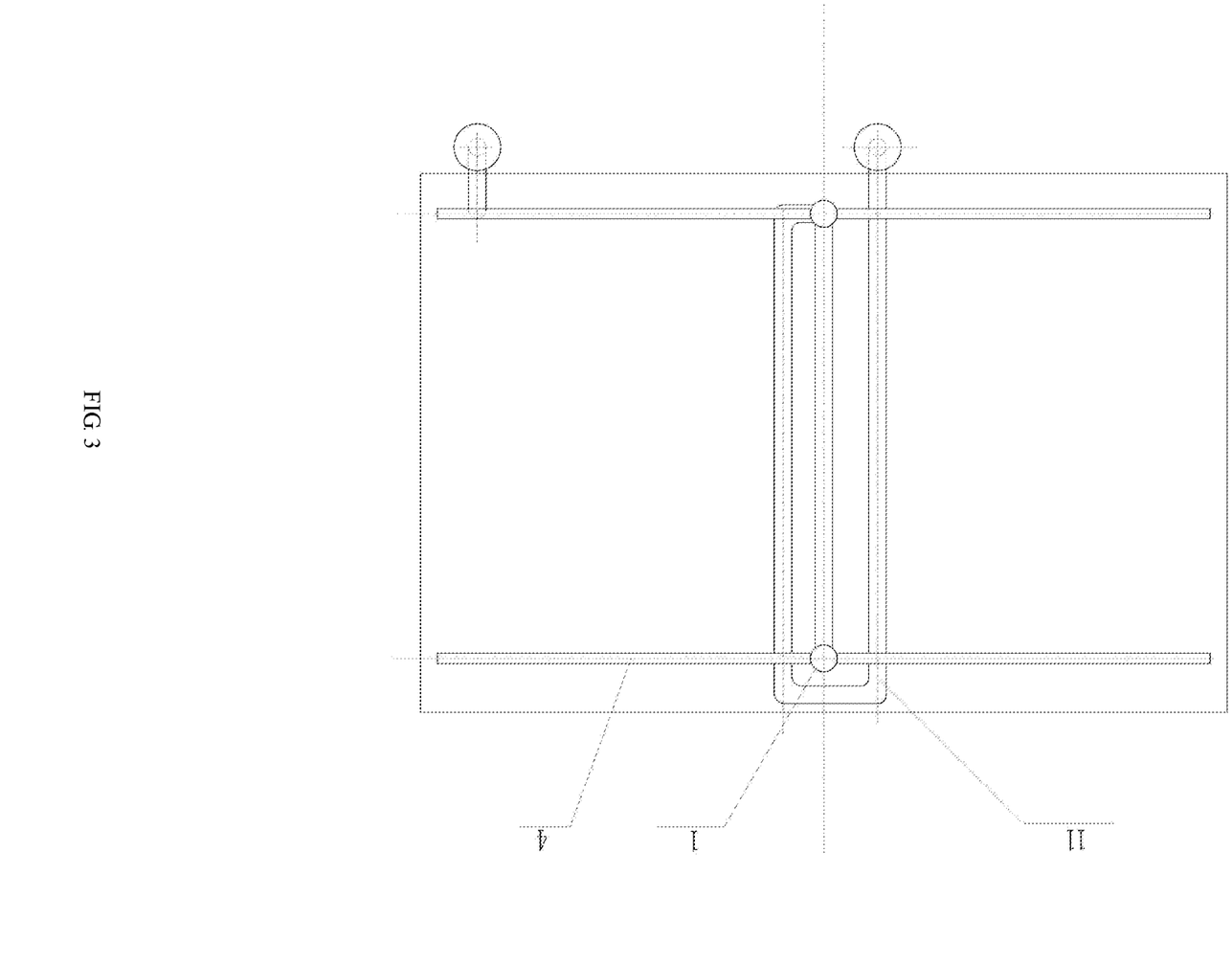
FIG. 3 is a side view of a structure of Embodiment 1.

Embodiment 1: refer to FIG. 1 to FIG. 3, in one aspect, the present invention provides a leveling differential-pressure diversion peak-shaving water tank with a function of preventing stagnant water and stale water, comprising:

a water storage and distribution tank 5;

a water inlet pipeline, arranged at the upper portion of the water storage and distribution tank and used for feeding water into the water storage and distribution tank 5; wherein the water inlet pipeline comprises a main water inlet pipe 2 and a plurality of water inlet branch pipes 4; a water inlet port is formed in one end of the main water inlet pipe 2, and the other end is closed; one end of each water inlet branch pipe 4 is communicated with the main water inlet pipe 2, and the other end is closed; a plurality of discharging holes are formed in the side wall of each water inlet branch pipe 4 and are used for discharging water from the main water inlet pipe 2 to the water storage and distribution tank 5;

a water outlet pipeline, arranged at the lower portion of the water storage and distribution tank 5 and comprising a main water outlet pipe 14 and a plurality of water outlet branch pipes 18, wherein one end of each water outlet branch pipe 18 is connected with the main water outlet pipe 14; a plurality of water-absorbing holes A 15 are formed in the pipe wall of each water outlet branch pipe 18 and are uniformly distributed in the bottom of the water storage and distribution tank 5;

a front tank, comprising a front tank water box 19, a front tank water inlet pipeline 9 and a front tank water outlet pipeline 7, wherein the front tank water inlet pipeline 9 comprises a main front tank water inlet pipe 8 and a plurality of front tank water inlet branch pipes 16; one end of the main front tank water inlet pipe 16 is communicated with the main water outlet pipe 14 of the water storage and distribution tank 5; a water level control valve is arranged on the main front tank water inlet pipe 16, and the control valve is switched on when the water level of the front tank water box reaches a preset value; one end of each front tank water inlet branch pipe 16 is vertically communicated with the main front tank water inlet pipe 8, and the other end is closed; a plurality of water-absorbing holes B 17 are formed in the side wall of each front tank water inlet branch pipe 16, and the area sum of the water-absorbing holes B 17 is less than the area sum of the water absorbing holes A 15; the front tank water outlet pipeline 7 is used for connecting a water pump water supply pipeline. The level control valve is a micro-resistance water inlet check valve 6 in the prior art, referring to the patent with Chinese Patent Application No. CN208309689U.

The water storage and distribution tank 5 and the front tank water box 19 integrally form a water supply tank. The water supply tank is divided into the first chamber and the second chamber by a separator. The first chamber is the water storage and distribution tank 5, and the second chamber is the front tank water box 19.

The leveling differential-pressure diversion peak-shaving water tank with a function of preventing stagnant water and stale water further comprises an aerating and flushing pipeline. The aerating and flushing pipeline comprises an aerating pipe 11 and a flushing pipe 1.

An air inlet of the aerating pipe 11 is connected with an air source, and an air outlet thereof is communicated with the main water outlet pipe 14.

One end of the flushing pipe 1 is communicated with the aerating pipe 11, and the other end is communicated with the main water inlet pipe 2.

The flushing pipe is provided with a control valve A 13. A control valve B 12 is arranged on the aerating pipe before the flushing pipe 1. A control valve C 3 is arranged on the main water inlet pipe 2 and between the aerating pipe 11 and the flushing pipe 1.

The aerating pipe 11 is arranged approximately in the shape of n. The aerating pipe enters the water storage and distribution tank 5 from the bottom of the water storage and distribution tank 5, goes upwards and around the main water inlet pipe 2, then goes downwards and is communicated with the main water outlet pipe 14. Such arrangement of the aerating pipe can prevent the water in the water outlet branch pipes 18 from entering the aerating pipe 11 through the water-absorbing holes A 15.

The leveling differential-pressure diversion peak-shaving water tank with a function of preventing stagnant water and stale water further comprises a draining pipe 10 for emptying water in the water storage and distribution tank 5 and/or the front tank water box 19.

Figure 4:
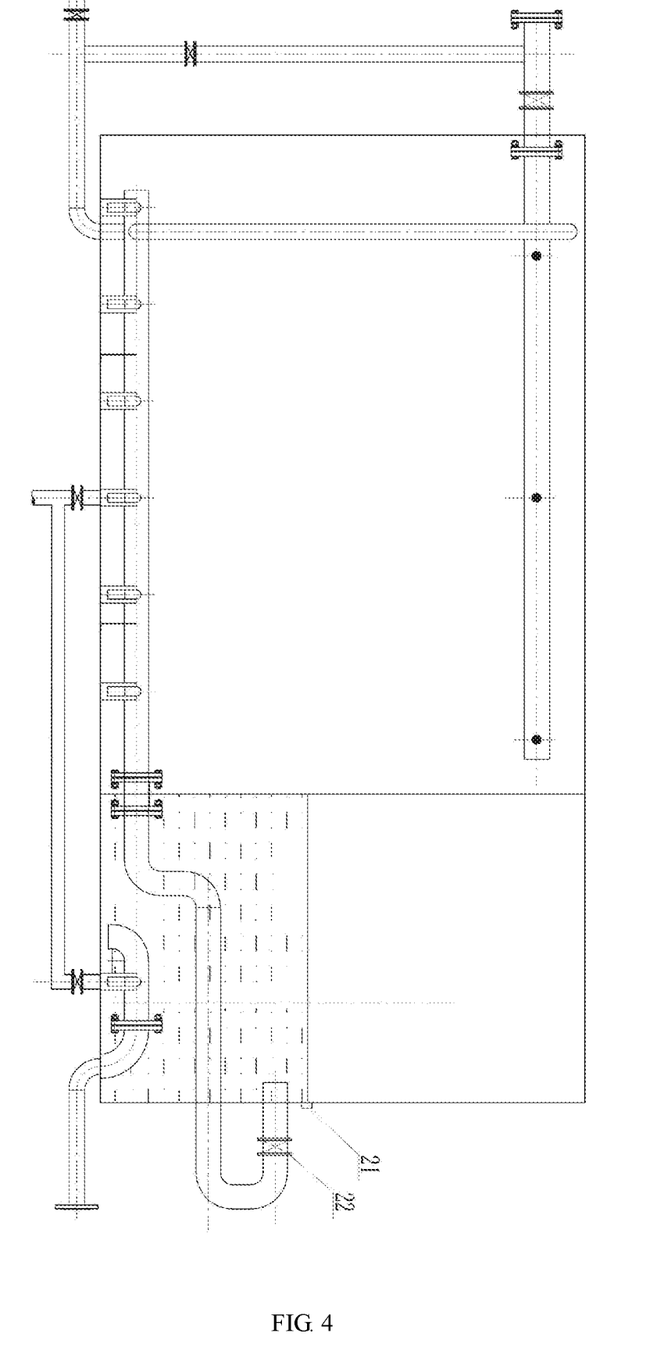
FIG. 4 is a schematic structural diagram of Embodiment 2.

Embodiment 2: refer to FIG. 4, the difference of Embodiment 2 from Embodiment 1 lies in:

The water level control valve has a different structure. In embodiment 2, the water level control valve comprises an electrically-actuated diverter valve 22 and a water level sensor 21. The electrically-actuated diverter valve 22 and the water level sensor 21 are connected with a control system through a control circuit. The electrically-actuated diverter valve 22 is arranged on the main front tank water inlet pipe 8. The water level sensor 21 is arranged on the front tank water box 19. When the water level of the front tank water box 19 reaches a preset value of the water level sensor 22, the electrically-actuated diverter valve 22 is switched on.

Figure 5:
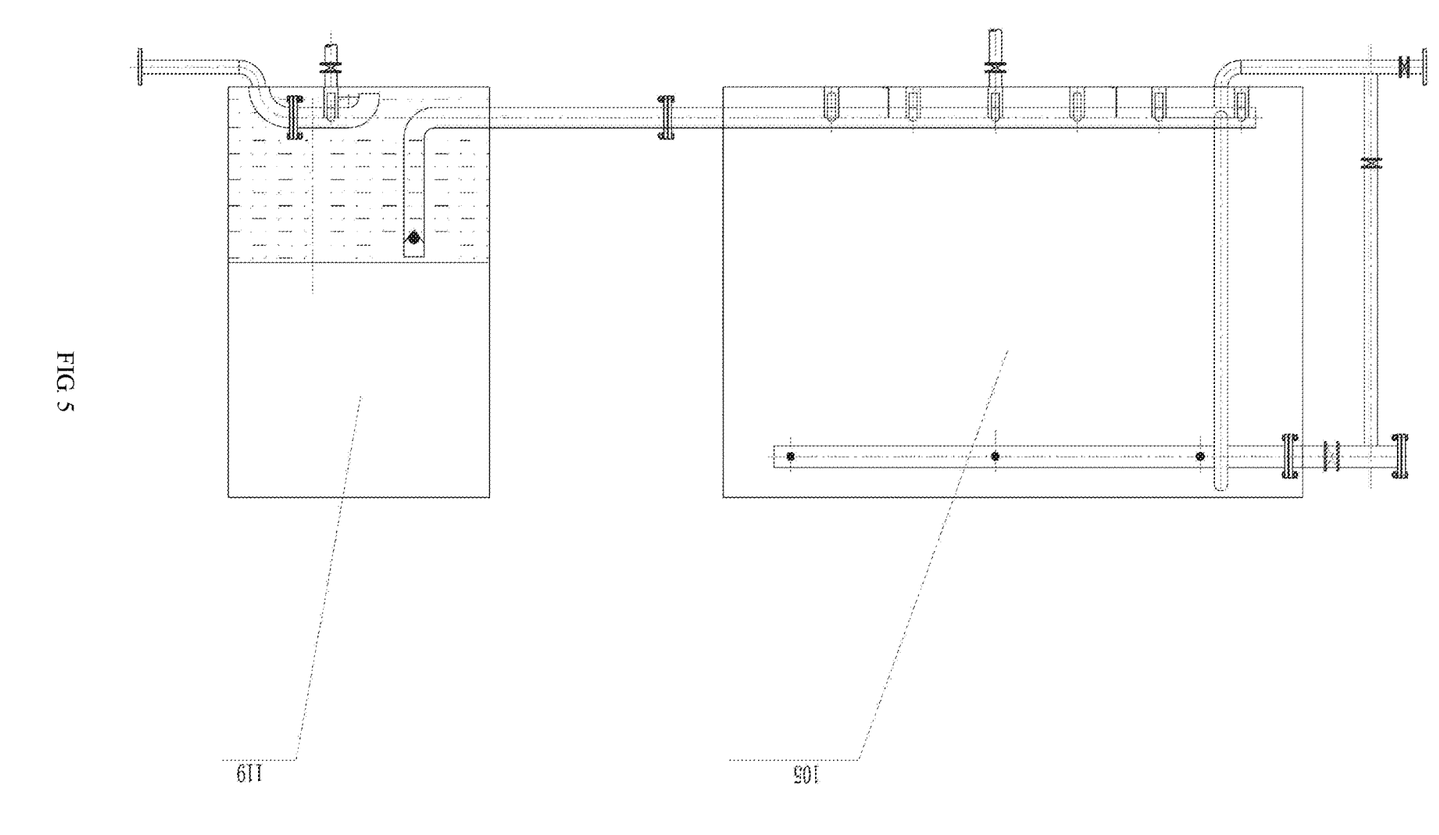
FIG. 5 is a schematic structural diagram of Embodiment 3.

Embodiment 3: refer to FIG. 5, the difference of Embodiment 3 from Embodiment 1 lies in: the water storage and distribution tank 105 and the front tank water box 119 are separated.

Embodiment 4: in another aspect, the present invention further provides a water supply pumping station. The water supply pumping station comprises the leveling differential-pressure diversion peak-shaving water tanks with a function of preventing stagnant water and stale water in Embodiment 1, Embodiment 2 or Embodiment 3.

The foregoing embodiments merely exemplarily describe the principles and effects of the present invention, but are not intended to limit the present invention. Any person skilled in the art may modify or change the foregoing embodiments without departing from the spirit and scope of the present invention. Therefore, any equivalent modification or change made by any person of ordinary skill in the technical field without departing from the spirit and technical ideas disclosed in the present invention shall fall within the claims of the present invention.

The invention claimed is:

1. A leveling differential-pressure diversion peak-shaving water tank with a function of preventing stagnant water and stale water, comprising:

a water storage and distribution tank;

a water inlet pipeline, arranged at an upper portion of the water storage and distribution tank and used for feeding water into the water storage and distribution tank;

a water outlet pipeline, arranged at a lower portion of the water storage and distribution tank and comprising a main water outlet pipe and a plurality of water outlet branch pipes, wherein one end of each water outlet branch pipe is connected with the main water outlet pipe, and the other end is closed; a first plurality of water-absorbing holes are formed in a pipe wall of each water outlet branch pipe and are uniformly distributed in a bottom of the water storage and distribution tank;

a front tank, comprising a front tank water box, a front tank water inlet pipeline and a front tank water outlet pipeline, wherein the front tank water inlet pipeline comprises a main front tank water inlet pipe and a plurality of front tank water inlet branch pipes; one end of the main front tank water inlet pipe is communicated with the main water outlet pipe of the water storage and distribution tank; a water level control valve is arranged on the main front tank water inlet pipe, and the control valve is switched on when a water level of the front tank water box reaches a preset value; one end of each front tank water inlet branch pipe is vertically communicated with the main front tank water inlet pipe, and the other end is closed; a second plurality of water-absorbing holes are formed in a side wall of each front tank water inlet branch pipe, and an area sum of the second plurality of water-absorbing holes is less than an area sum of the first plurality of water absorbing holes; the front tank water outlet pipeline is used for connecting a water pump water supply pipeline.

2. The leveling differential-pressure diversion peak-shaving water tank with a function of preventing stagnant water and stale water according to claim 1, wherein the water inlet pipeline comprises a main water inlet pipe and a plurality of water inlet branch pipes; a water inlet port is formed in one end of the main water inlet pipe, and the other end is closed; one end of each water inlet branch pipe is communicated with the main water inlet pipe, and the other end is closed; a plurality of discharging holes are formed in a side wall of each water inlet branch pipe and are used for discharging water from the main water inlet pipe to the water storage and distribution tank.

3. The leveling differential-pressure diversion peak-shaving water tank with a function of preventing stagnant water and stale water according to claim 1, wherein the water level control valve is a micro-resistance water inlet check valve.

4. The leveling differential-pressure diversion peak-shaving water tank with a function of preventing stagnant water and stale water according to claim 1, wherein the water level control valve comprises an electrically-actuated diverter valve and a water level sensor; the electrically-actuated diverter valve and the water level sensor are connected with a control system through a control circuit; the electrically-actuated diverter valve is arranged on the main front tank water inlet pipe; the water level sensor is arranged on the front tank water box; when the water level of the front tank water box reaches a preset value of the water level sensor, the electrically-actuated diverter valve is switched on.

5. The leveling differential-pressure diversion peak-shaving water tank with a function of preventing stagnant water and stale water according to claim 1, wherein the water storage and distribution tank and the front tank water box integrally form a water supply tank; the water supply tank is divided into a first chamber and a second chamber by a separator; the first chamber is the water storage and distribution tank, and the second chamber is the front tank water box.

6. The leveling differential-pressure diversion peak-shaving water tank with a function of preventing stagnant water and stale water according to claim 2, wherein the water storage and distribution tank and the front tank water box integrally form a water supply tank; the water supply tank is divided into a first chamber and a second chamber by a separator; the first chamber is the water storage and distribution tank, and the second chamber is the front tank water box.

7. The leveling differential-pressure diversion peak-shaving water tank with a function of preventing stagnant water and stale water according to claim 3, wherein the water storage and distribution tank and the front tank water box integrally form a water supply tank; the water supply tank is divided into a first chamber and a second chamber by a separator; the first chamber is the water storage and distribution tank, and the second chamber is the front tank water box.

8. The leveling differential-pressure diversion peak-shaving water tank with a function of preventing stagnant water and stale water according to claim 4, wherein the water storage and distribution tank and the front tank water box integrally form a water supply tank; the water supply tank is divided into a first chamber and a second chamber by a separator; the first chamber is the water storage and distribution tank, and the second chamber is the front tank water box.

9. The leveling differential-pressure diversion peak-shaving water tank with a function of preventing stagnant water and stale water according to claim 2, further comprising an aerating and flushing pipeline, wherein the aerating and flushing pipeline comprises an aerating pipe and a flushing pipe;

an air inlet of the aerating pipe is connected with an air source, and an air outlet thereof is communicated with the main water outlet pipe;

one end of the flushing pipe is communicated with the aerating pipe, and the other end is communicated with the main water inlet pipe;

the flushing pipe is provided with a control valve A; a control valve B is arranged on the aerating pipe before the flushing pipe; a control valve C is arranged on the main water inlet pipe and between the aerating pipe and the flushing pipe.

10. The leveling differential-pressure diversion peak-shaving water tank with a function of preventing stagnant water and stale water according to claim 9, wherein the aerating pipe is arranged approximately in the shape of n; the aerating pipe enters the water storage and distribution tank from the bottom of the water storage and distribution tank, goes upwards and around the main water inlet pipe, then goes downwards and is communicated with the main water outlet pipe.

11. The leveling differential-pressure diversion peak-shaving water tank with a function of preventing stagnant water and stale water according to claim 1, further comprising a draining pipe for emptying water in the water storage and distribution tank and/or the front tank water box.

12. The leveling differential-pressure diversion peak-shaving water tank with a function of preventing stagnant water and stale water according to claim 2, further comprising a draining pipe for emptying water in the water storage and distribution tank and/or the front tank water box.

13. The leveling differential-pressure diversion peak-shaving water tank with a function of preventing stagnant water and stale water according to claim 3, further comprising a draining pipe for emptying water in the water storage and distribution tank and/or the front tank water box.

14. A water supply pumping station, at least comprising one of the leveling differential-pressure diversion peak-shaving water tanks with a function of preventing stagnant water and stale water according to claim 1.

* * * * *